Patented Dec. 22, 1931

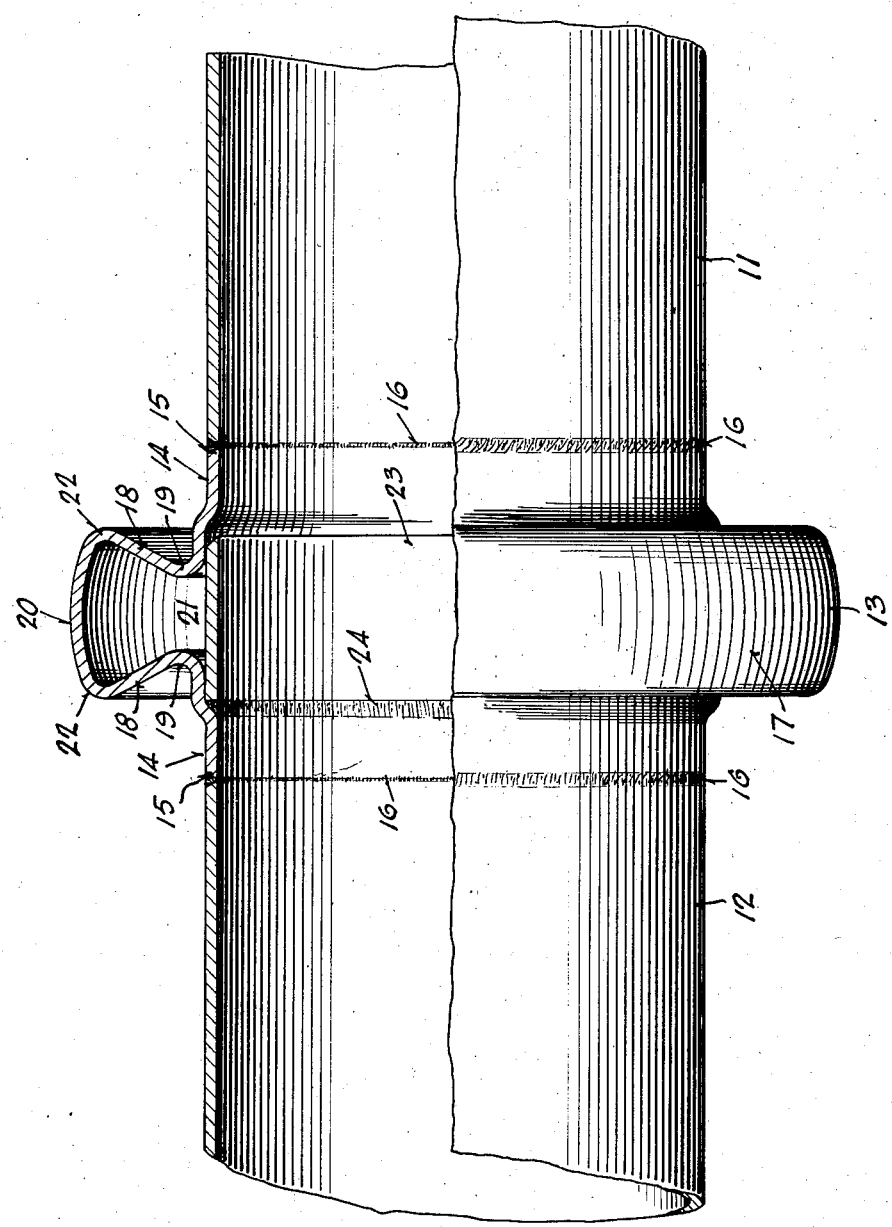

1,837,490

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

EXPANSIBLE JOINT FOR PIPE LINES

Application filed February 24, 1928. Serial No. 256,546.

An ordinary expansible joint now of commerce consists of a tubular member of sheet metal having an integral annular bulge of U-shape, comprising annular spaced apart parallel side walls contiguous with the full circumferences of the walls of the tubular member and extending perpendicularly away from said tubular member walls, and an outer wall, usually about concentric with the tubular member walls, connecting said sidewalls. Upon deformation in longitudinal direction of such an expansible joint, caused by expansion and contraction of sections of a pipe line connected by the joint, the application of the stresses to the annular side walls is directly at the locations of the inner bends (where the annular side walls meet the walls of the tubular member) of the annular bulge, and the flexing of the metal of the joint at said inner bends is, as a consequence, sharply pronounced. But the application of the stresses to the outer bends (where the annular side walls merge into the annular outer wall) is through the bodies of the annular side walls, and flexing at said outer bends is of less magnitude, for the reason that the deforming forces are applied perpendicularly to the surfaces of the annular side walls to misshape them, it being evident that the stresses produced at the inner bends by deformation in longitudinal direction of the pipe sections, and operating perpendicularly to the annular side walls, are more liable to cause bending of the bodies of the side walls at locations closer to the inner bends (where the stresses are directly applied) than at the locations of the outer bends (spaced from the locations of the application of the stresses).

One of the purposes of my invention is to produce an expansible joint having an integral annular bulge of greatly improved construction designed with the purpose in view of materially increasing the capacity of the expansible joint to accommodate itself to deformations caused by relative longitudinal movements of pipe sections, which the joint connects, by uniformly distributing all of the longitudinal flexing movement of the metal of the expansible joint between the inner and outer bends of the annular bulge thereof to thus insure that the bodies of the annular side walls of said bulge will not become misshaped.

Another purpose of my invention is to provide an expansible joint which will have a minimum resistance to the flow of the fluid through the pipe line. My invention is particularly adapted for use in pipe lines for the transportation of oil or other fluids under high pressure wherein the velocity of the medium being transferred sometimes approaches the speed of seventy miles per hour. In such construction it is obvious that the pipe line should remain unobstructed throughout its length. It has been found that exposed internal corrugations in the expansion joints cause an eddy current to be set up within the fluid and to materially retard the progress of the fluid through the pipe.

To the accomplishment of the purpose as stated, I provide an expansible joint consisting of a sheet metal tubular member having an annular bulge integral with and approximately perpendicular to said tubular member and continuous about the full circumference of the walls thereof, and I so construct the annular bulge that it will consist of annular spaced apart side walls which extend outwardly in diverging relation to each other, away from the walls of the tubular member, and which side walls are at their inner ends contiguous with said tubular member walls and are at their outer ends connected by an annular outer wall desirably approximately concentric with the tubular member and about in the plane of the space between the inner ends of the side walls of the annular bulge, so that the application of the deforming stresses to the annular side walls, caused by expansion and contraction of the pipe sections, will be directly at the locations of the inner bends of the annular bulge, and the application of said stresses to the outer bends of the bulge will be through the instrumentality of annular side walls positioned obliquely to the direction of movement of the stressing forces and adapted to withstand the strain without becoming misshaped, whereby all of the longitudinal flexing movement of the metal of the expansible joint will be about equally distributed between the inner and outer bends of the annular bulge thereof.

The single view of the drawing discloses, partially in elevation, partially in section, and partially broken away, fragments of pipe sections and an expansible joint made in accordance with the invention between said sections.

In the drawing I have shown a pipe section 11 connected with a pipe section 12 by employment of an expansible joint 13 in which the features of my invention are incorporated.

The novel expansible joint consists, generally, of a tubular member 14 having its opposite open ends 15 welded or otherwise joined in any suitable manner, as at 16, to the adjacent open ends of the pipe sections, and provided, desirably about the midlength of the tubular member, with an annular bulge 17. More specifically, the annular bulge is constituted by annular spaced apart side walls 18, integral and contiguous at their inner ends with the walls of the tubular member and extending outwardly in diverging relation from the full circumference of said tubular member walls to thus provide inner acute angle bends 19, and an annular outer wall 20, desirably approximately concentric with the tubular member and in the plane of the space 21 between the inner ends of the side walls 18, connecting said annular side walls to thus provide outer acute angle bends 22.

A circular band 23 in the coupling and welded or otherwise attached at one of its ends, as at 24, to a circumference of the tubular member adjacent the annular bulge, may be of any ordinary or preferred construction to cover the space 21 and at the same time not interfere with the deformations of the expansible joint.

It will be apparent that deforming stresses due to relative longitudinal movements of the pipe sections 11 and 12, caused by expansion and contraction, will be applied to the expansible joint 13 directly at the inner acute angle bends 19, and that application of said deforming stresses will be transmitted to the outer acute angle bends 22 through the annular side walls 18. In view of the fact that these side walls are disposed obliquely to the direction of longitudinal expansive and contractive movement of the pipe sections, they will, obviously, withstand the strain, without bending or becoming otherwise misshaped, to transmit all of the deforming movement, except that absorbed by the inner bends, to the outer acute angle bends 22. Thus, the whole of the flexing movement of the metal of the expansible joint is uniformly (approximately equally) distributed between the inner and outer bends of the annular bulge thereof.

Having thus described my invention, what I claim and desire to secure by Letters Patent of the United States, is:

1. An expansible joint for pipe lines comprising a tubular member adapted to be connected to adjacent sections of said pipe and having an intermediate portion of enlarged diameter therein, said tubular member having outwardly flared portions adjacent said portion of enlarged diameter, a sleeve disposed in said outwardly flared portions and bridging said portion of enlarged diameter to provide a uniform internal diameter in said tubular member whereby an unobstructed flow of fluid through the pipe line may be effected, said sleeve being welded to the tubular member.

2. In an expansible connector for pipe line sections, in combination, a tubular connector having an end of substantially the same diameter as the end of the pipe line section to which it is to be connected, a weld uniting the connector and the pipe line section, an intermediate portion of the connector being corrugated circumferentially to permit distortion of the connector, a portion of the connector adjacent the corrugated portion being of a diameter larger than the diameter of the pipe section, and a sleeve disposed in the portion of larger diameter and extending longitudinally of the connector, said sleeve being welded to the connector to retain it in position.

3. An expansion coupling for pipe lines, comprising a component section of the line adapted to be connected therein and having a portion of somewhat larger diameter than the diameter of the pipes to be joined, a circumferential corrugation intermediate the ends of the said portion to permit expansion and contraction, the said portion of larger diameter extending a short distance on each side of the corrugation, and a sleeve element fitting within the portion of enlarged diameter and extending longitudinally thereof to bridge the said corrugation, the said sleeve being circumferentially welded to the said portion and having an internal diameter which is substantially the same as that of the pipes to be joined, whereby an unobstructed flow of fluid past the joint may be effected.

4. In an expansible connector for pipe line sections, in combination, a tubular connector having ends of substantially the same diameter as the ends of the pipe line sections to which it is to be connected, and welds uniting the connector and the pipe line sections, an intermediate portion of the connector being corrugated circumferentially to permit distortion of the connector.

In testimony whereof I have signed my name at Milwaukee, Wisconsin, this 21st day of February, 1928.

R. STRESAU.